United States Patent [19]

Takahara et al.

[11] Patent Number: 5,381,158
[45] Date of Patent: Jan. 10, 1995

[54] INFORMATION RETRIEVAL APPARATUS

[75] Inventors: Kenichi Takahara, Tokyo; Atsuko Kawamoto, Yokohama; Takao Suzuki, Tokyo, all of Japan

[73] Assignee: Kabushiki Kaisha Toshiba, Kawasaki, Japan

[21] Appl. No.: 223,132

[22] Filed: Apr. 5, 1994

Related U.S. Application Data

[63] Continuation of Ser. No. 911,480, Jul. 10, 1992, abandoned.

[30] Foreign Application Priority Data

Jul. 12, 1991 [JP] Japan .................. 3-172770

[51] Int. Cl.⁶ .............................................. G09G 5/00
[52] U.S. Cl. ...................................... 345/156; 395/600; 395/161
[58] Field of Search ............... 340/706, 707, 709, 710, 340/712; 345/156; 395/161, 600

[56] References Cited

U.S. PATENT DOCUMENTS

| | | | |
|---|---|---|---|
| 4,414,537 | 11/1983 | Grimes . | |
| 4,628,305 | 12/1986 | Ikeda | 345/150 |
| 4,914,624 | 4/1990 | Dunthorn . | |
| 5,148,154 | 9/1993 | MacKay et al. | 340/712 |
| 5,168,531 | 12/1992 | Sigel | 340/709 |
| 5,184,319 | 2/1993 | Kramer | 340/706 |

FOREIGN PATENT DOCUMENTS 363089 9/1991 Japan .

OTHER PUBLICATIONS

R. A. Bolt, pp. 13–33, 62–77, and p. 162, "The Human Interface", 1984.

Primary Examiner—Jeffery Brier
Attorney, Agent, or Firm—Oblon, Spivak, McClelland, Maier & Neustadt

[57] ABSTRACT

An information retrieval apparatus features a three-dimensional display unit for displaying a set of indexes controlling attributes of a database in a three-dimensional image space in sight of a user with index display images so as to allow the user to visually recognize the set of indexes. An input unit detects motion patterns of the user's body against the index display images as input information and displays the motion patterns in the three-dimensional image space. An arithmetic operation unit recognizes the input information of the motion patterns received through the input unit and performs set logical operations of selected images in accordance with the motion patterns so as to collate and retrieve information from the database. The user can further directly operate index display images in a three-dimensional image space or a two-dimensional image space without the necessity of a keyboard and recognize input information with his body's motion patterns. The arithmetic operation unit performs set logical operations of indexes displayed with predetermined index display images so as to retrieve desired information from a database. Thus, even if the user does not have enough experience in operating conventional input and output units, such as a keyboard, he can readily and accurately retrieve desired objects from a medium such as a database.

9 Claims, 20 Drawing Sheets

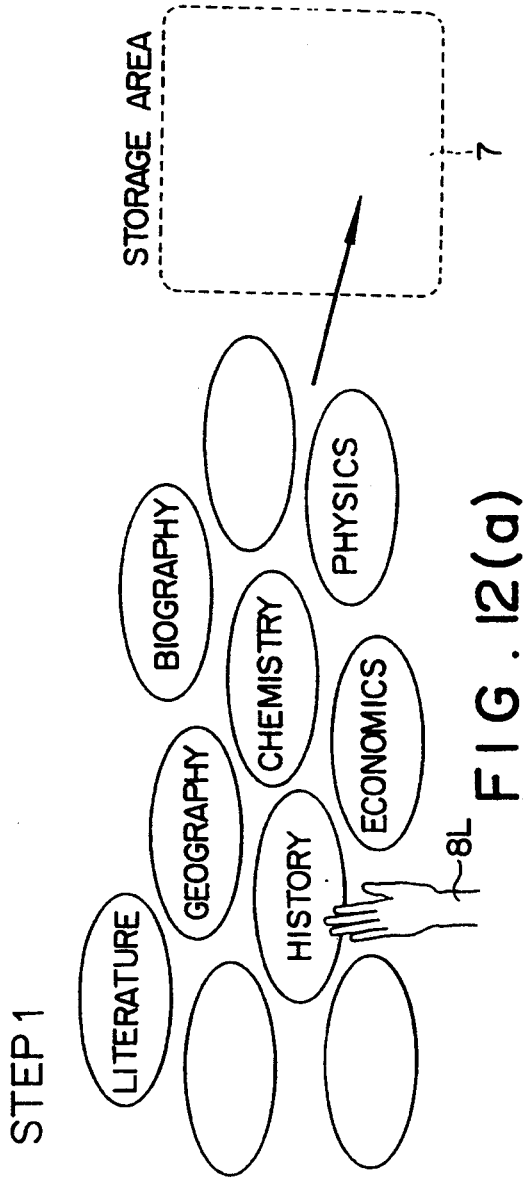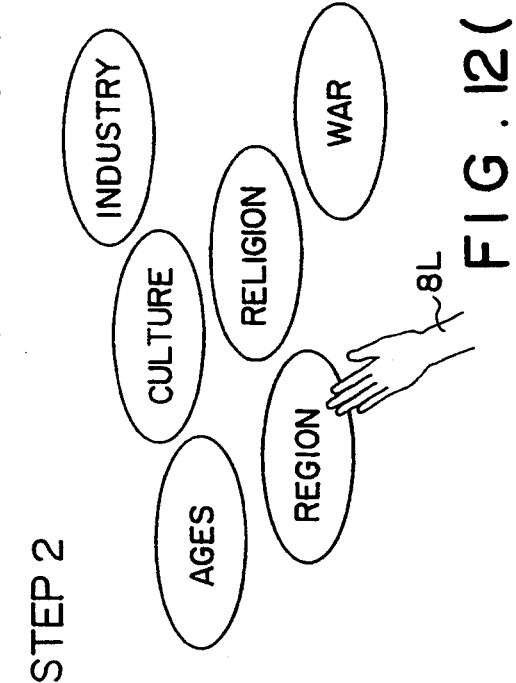
FIG. 12(a)
FIG. 12(b)

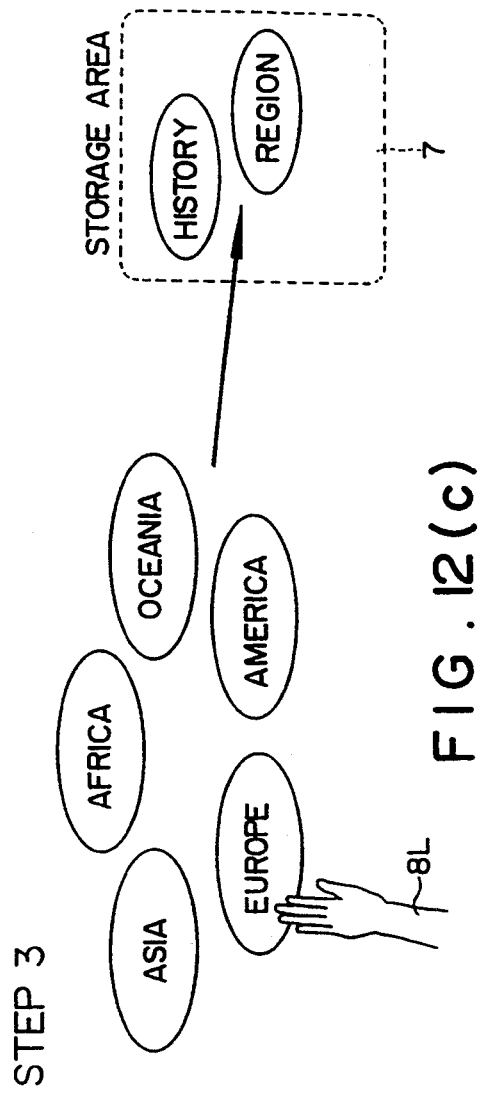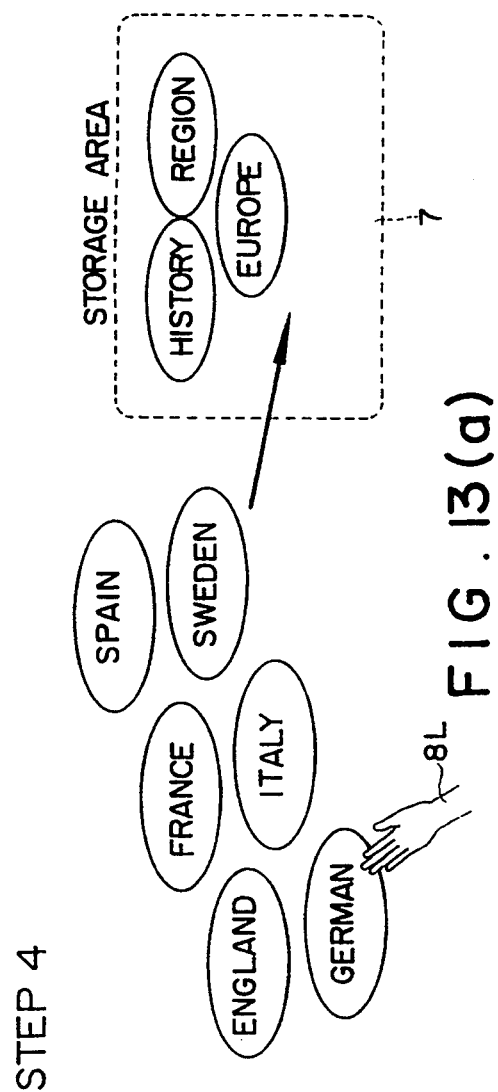

INFORMATION RETRIEVAL APPARATUS

This application is a continuation of application Ser. No. 07/911,480, filed on Jul. 10, 1992, now abandoned.

BACKGROUND OF THE INVENTION

1. Field of the Invention

The present invention relates to an information retrieval apparatus, and in particular to an information retrieval apparatus with artificial reality (AR) where the user can select and hold capsule images that a three-dimensional image display unit displays in a three-dimensional image space with his hands so as to collate and retrieve information from a database.

2. Description of the Related Art

In this age of information, flooding, there is a great need for quickly and accurately retrieving desired information. Thus, the importance of an operation for readily retrieving a great amount of information is increasing.

Input and output (I/O) interfaces such as a keyboard, a touch panel, and a mouse for use in the conventional information retrieval apparatuses are used to input keywords and the like. With keywords being input, information is collated and retrieved in the forms of images and hard copies. Thus, thus far, only users who are accustomed to the operations of the keyboard and familiar with the relevant database system can retrieve desired information by operating the keyboard and so forth of the terminal units.

On the other hand, in the recent computer simulation field, user-friendly computer interfaces which ingeniously utilize human beings' motions and their five senses such as sight and hearing have been developed and studied. These interfaces are referred to as artificial reality.

At the present time, the artificial reality can be divided into two major categories. One is referred to as virtual reality in which a "user agent" who is an agent of the user of the interface is displayed in computer graphics images. The user can experience a world which is spread out in the computer graphics images through the "user agent."

The other category is referred to as tele-existence in which the user can operate a robot at a remote position as his agent through a manipulator. While the tele-existence focuses on operations under the real environment, the virtual reality focuses on the use of the "user agent" as an interface of the computer itself.

As an example of computer simulation tools for accomplishing the above mentioned virtual reality, a three-dimensional display unit and data gloves have been developed. The former three-dimensional display unit provides for a three-dimensional computer graphics world. A variety of three-dimensional display units have been proposed by U.S. Pat. Nos. 4,881,068, 4,853,769, 4,834,476, 4,160,973, and so forth. In the virtual reality, some three-dimensional display units utilize a mechanism where the motions of the user's hands do not intercept the images being displayed so that he can feel that he is directly handling three-dimensional images with his hands. For example, "Eyephone" which was developed by NASA and produced by VPL Research Company (United States) is a three-dimensional display unit which is in a ski goggle shape and has an LCD display device inside thereof.

On the other hand, the data gloves are input interfaces for inputting the motions of the user's hands into a computer. The data gloves are provided with magnetic sensors and optical fiber cables over the surface thereof. Thus, the user can detect and recognize the positions and motion patterns of his hands and input particular information into the computer.

As was described above, the conventional information retrieval apparatuses with a conventional keyboard and so forth were not user friendly. Even if they were user friendly, they could not be effectively operated. In addition, since retrieved information was displayed on a flat display such as a CRT (cathode ray tube) monitor, the user could not straightforwardly recognize the weighting of retrieval indexes. Further, with the flat display, another display method for displaying a plurality of screens at a time, that is, a multi-window could be used. However, as the amount of information increased, since the display screens were overlapped, the visibility deteriorated, and the correlations between each information of retrieval indexes could not be effectively displayed.

On the other hand, the virtual reality was used as a simulation tool of computer graphics. However, thus far, the virtual reality has not yet been used for designating media directly accessing a database stored in a computer with the data gloves and for performing set logical operations.

An object of the present invention is to solve the above mentioned problems involved in the related art and to provide an information retrieval apparatus with which the user can select media as indexes allocated as images in the image space with his hands, issue predetermined commands, and straightforwardly retrieve information from a database.

SUMMARY OF THE INVENTION

The present invention relates to an information retrieval apparatus, and in particular to an information retrieval apparatus with artificial reality (AR) where the user can select and hold capsule images that a three-dimensional image display unit displays in a three-dimensional image space with his hands so as to collate and retrieve information from a database.

An object of the present invention is to solve the above mentioned problems involved in the related art and to provide an information retrieval apparatus with which the user can select media as indexes allocated as images in the image space with his hands, issue predetermined commands, and straightforwardly retrieve information from a database.

The present invention in one aspect thereof provides an information retrieval apparatus, comprising a three-dimensional display unit for displaying a set of indexes controlling attributes of a database in a three-dimensional image space in the sight of a user with index display images so as to allow the user to visually recognize the set of indexes, an input unit for detecting a motion pattern of the user's body against the index display images as input information and for displaying the motion patterns in the three-dimensional image space, and an arithmetic operation unit for recognizing the input information of the motion patterns received through the input unit and for performing set operations of indexes displayed with predetermined index display images so as to collate and retrieve information from the database.

The present invention in another aspect thereof provides an information retrieval apparatus, comprising a three-dimensional display unit for displaying a set of indexes controlling attributes of a database in a three-dimensional image space in the sight of a user with index display images and for allowing the user to visually recognize the set of indexes with operation capsule images, an input unit for detecting motion patterns of the user's body against the index display images and the operation capsule images as input information and for displaying the motion patterns in the three-dimensional image space, and an arithmetic operation unit for recognizing the input information of the motion patterns received through the input unit and for performing set operations of indexes displayed with predetermined index display images by using a logical operation means represented with the arithmetic operation capsule images so as to collate and retrieve information from the database.

The present invention in a further aspect thereof provides an information retrieval apparatus, comprising a two-dimensional display unit for displaying a set of indexes controlling attributes of a database in a two-dimensional image space in the sight of a user with index display images so as to allow the user to visually recognize the set of indexes, an input unit for detecting motion patterns of the user's body against the index display images as input information and for displaying the motion patterns in the two-dimensional image space, and an arithmetic operation unit for recognizing the input information of the motion patterns received through the input unit and for performing set operations of indexes displayed with predetermined index display images so as to collate and retrieve information from the database.

The present invention is an information retrieval apparatus, comprising a display unit for displaying a set of indexes controlling attributes of a database with index display images, an input means for inputting input information for causing predetermined index display images displayed on the display unit to perform predetermined motion patterns, and an arithmetic operation unit for recognizing input information through the input means and for performing set operations of indexes displayed with the index display images so as to collate and retrieve information from the database.

According to the present invention, the user can directly operate index display images in a three-dimensional image space or a two-dimensional image space without the necessity of a keyboard and recognize input information with his body's motion patterns. An arithmetic operation unit performs set logical operations of indexes displayed with predetermined index display images so as to retrieve and collate desired information from a database. Thus, even if the user does not have enough experience in operating the conventional input and output units such as a keyboard, he can readily and accurately retrieve desired objects from an information medium such as a database.

In addition, since a set of indexes for use in collating and retrieving information are displayed as index display images in the three-dimensional image space or the two-dimensional image space, the user can clearly and visually recognize the indexes for use in retrieving information, thereby making the information retrieval operation easy.

Further, since a variety of motion patterns of the user corresponding to index display images have been defined as particular input information, the retrieval apparatus can perform predetermined operations in accordance with the motion patterns. Thus, the user can readily select and discard indexes for use in retrieving information by using the input information. For example, by holding and flipping any index display image, the user can delete the corresponding retrieval index. By moving the index display image inwardly, the user can obtain the retrieval index.

Furthermore, index display images are displayed on the display unit. When input information for causing an index display image to perform a predetermined operation pattern is input through the display unit and set logical operations of indexes are performed by an arithmetic operation unit, information can be collated and retrieved from the database.

BRIEF DESCRIPTION OF THE DRAWINGS

These and other objects, features and advantages of the present invention will become more apparent in the light of the following detailed description of best mode embodiments thereof, as illustrated in the accompanying drawings, wherein

FIGS. 12(a), 12(b) and (c) are schematic diagrams showing information retrieval sequences of the encyclopedia retrieval system of FIG. 11;

DESCRIPTION OF PREFERRED EMBODIMENTS

An embodiment of the information retrieval apparatus of the present invention will now be described in accordance with a practical information collation and retrieval sequence.

Figure 1:
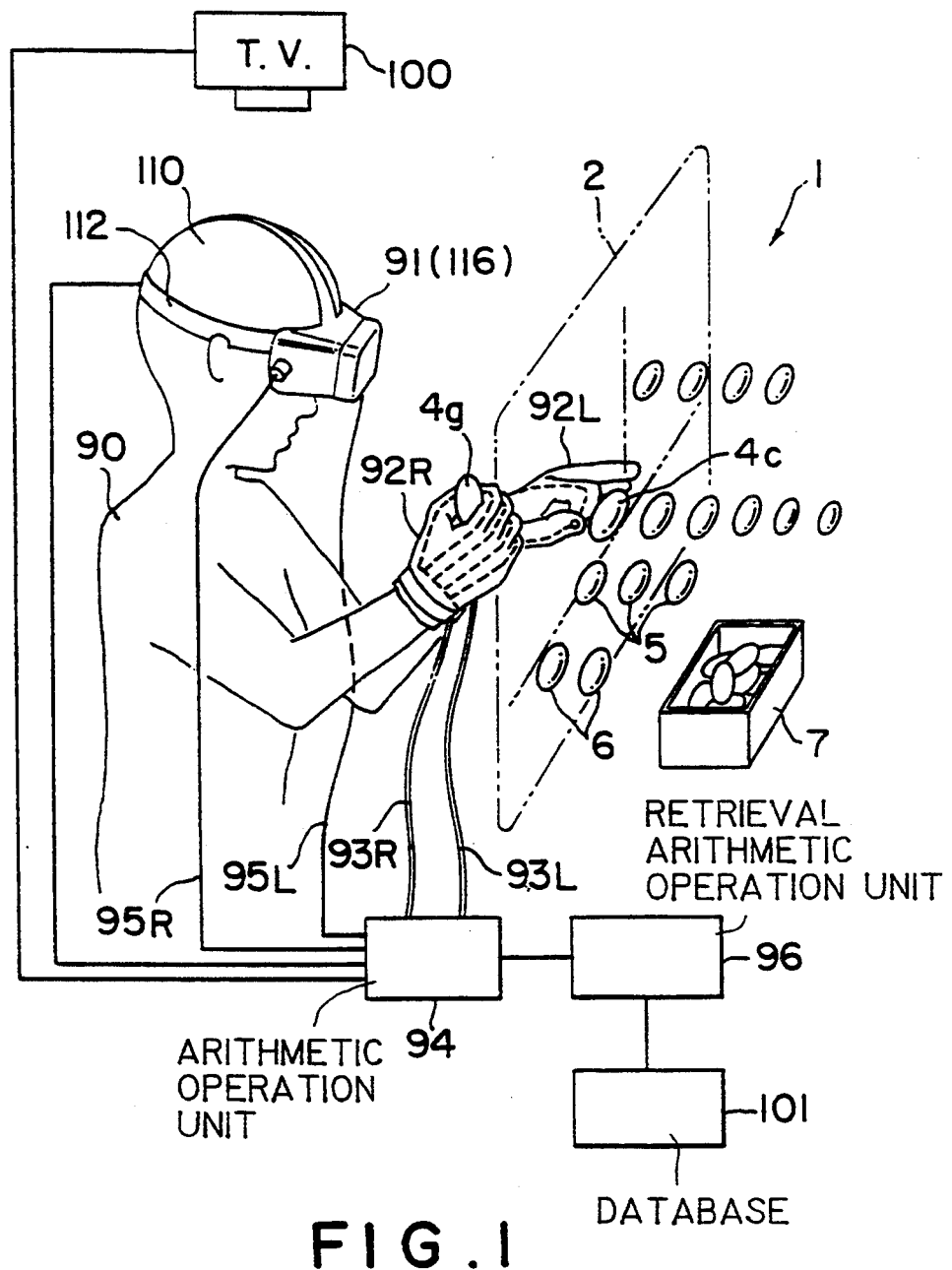
FIG. 1 is a schematic diagram virtually showing the relation between an embodiment of a three-dimensional image space displayed by an information retrieval apparatus in accordance with the present invention and a user thereof.
Figure 2:
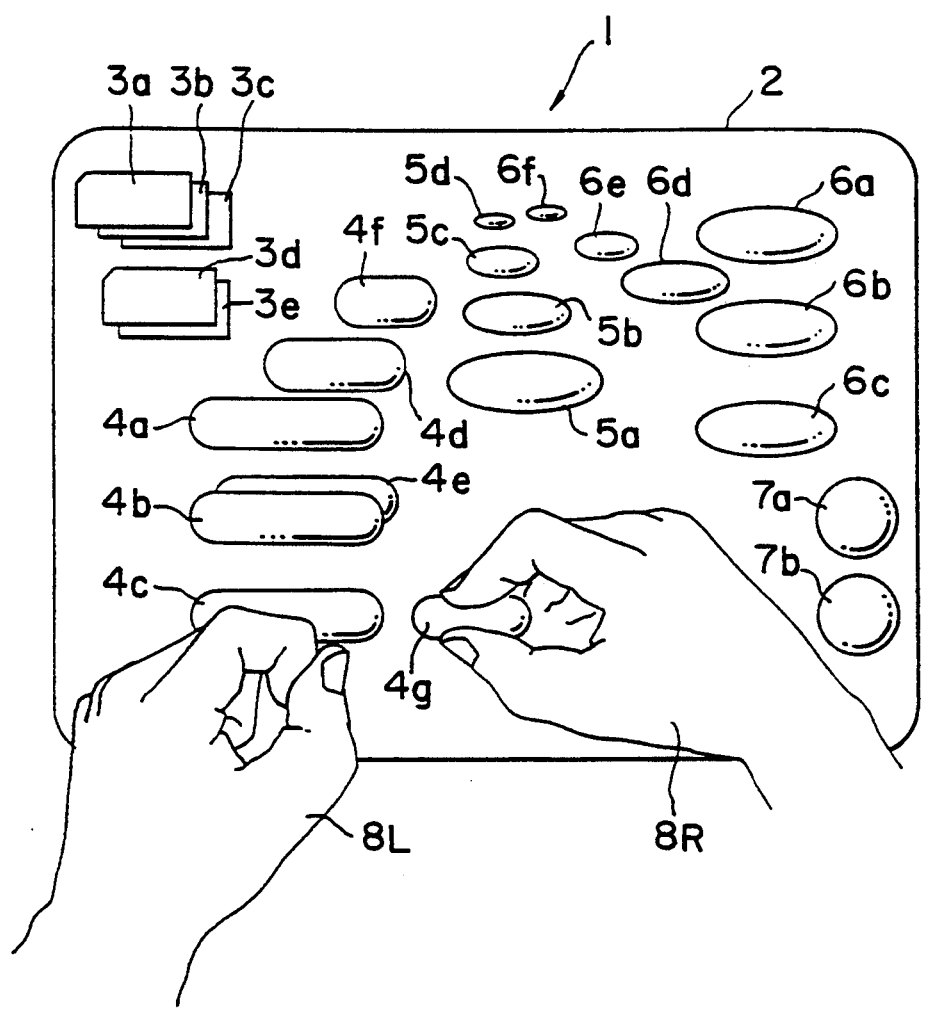
FIG. 2 is a schematic diagram conceptually showing a three-dimensional image space displayed by the information retrieval apparatus of FIG. 1.

FIG. 1 is a schematic diagram virtually showing the relation between an embodiment of a three-dimensional image space displayed by an information retrieval apparatus in accordance with the present invention and a user thereof from a third person's point of view. In the figure, reference numeral 90 is a user who retrieves information from a database using the information retrieval apparatus of the present invention, The user 90 wears a three-dimensional display unit 91 in a ski goggle shape on his face. In addition, the user is fitted with (wears) data gloves 92R and 92L on his two hands. The data gloves 92R and 92L are an example of an input unit. The data gloves 92R and 92L have signal lines 93R and 93L, respectively. The signal lines 93R and 93L are connected to an arithmetic operation unit 94. The arithmetic operation unit 94 generates particular input information data or process commands by using motion patterns of the user 90 which are detected through the data gloves 92R and 92L. In addition, the arithmetic operation unit 94 sends to the signal lines 95R and 95L signals for feeding back motions of the user 90 which are detected by the data gloves 92R and 92L and motions of capsule images in the three-dimensional image space. A retrieval arithmetic operation unit 96 is connected to a database 101 whose attributes are controlled with indexes. As shown in FIG. 2, the three-dimensional display unit 91 displays the motions of the data gloves 92R and 92L as virtual arms 8R and 8L in the image space so as to form a world of artificial reality in which the virtual arms 8R and 8L can handle a variety of capsule images 4, 5, and 6 displayed in the image space. In other words, before the eyes of the user 90, a three-dimensional image space as shown in FIG. 2 is displayed.

In the three-dimensional image space, the user 90 holds a capsule image 4g with his right hand data glove R and attempts to flip a capsule image 4c with his left hand data glove 92L. In this case, an image where the virtual right hand 8R attempts to hold the capsule image 4g and the virtual left hand 8L attempts to flip the capsule image 4C is displayed before the eyes of the user 90.

In FIG. 1, reference numeral 7 is a storage area. The storage area 7 has the shape of a box. The storage area 7 can accommodate a variety of capsules.

Next, the situation of the three-dimensional image space displayed before the eyes of the user 90 will be described in detail.

In FIG. 2, a frame 2 virtually represents an outline of a three-dimensional image space in which information is displayed. The three-dimensional image space is set in the range where the virtual arms 8R and 8L of the user 90, who wears the data gloves 92R and 92L on his hands, can amply reach. In the three-dimensional image space, capsule images shaped like rectangular cards 3a, 3b, 3c, 3d, and 3e; capsule images shaped like barrels 4a, 4b, 4c, 4d, 4e, 4f, and 4g; capsule images shaped like oblate spheres 5a, 5b, 5c, 5d, 6a, 6b, 6c, 6d, 6e, and 6f; and spherical capsule images 7a and 7b are displayed.

For example, the rectangular shaped capsule images shaped like rectangular cards 3a, 3b, 3c, 3d, and 3e represent a set of retrieval indexes of small personal information such as a directory. The retrieval indexes are sorted outwardly in the alphabetical order. The same level capsule images 4a, 4b, 4c, and 4g are displayed in the same depth. The next level capsule images 4d and 4e are displayed in a deeper position than the capsule images 4a, 4b, 4c, and 4g. The further lower level capsule image 4f is displayed in a further deeper position than the capsule image 4d and 4e. Likewise, the capsule images shaped like oblate spheres 5a, 5b, 5c, 5d, 6a, 6b, 6c, 6d, 6e, and 6f are weighted in accordance with the importance of the information or retrieval indexes. The spherical capsule images 7a and 7b displayed at the right end of the frame 2 can be used as process capsules representing the selection method and the storage area of information such as logical operations. The capsule images 3a, 3b, ..., 6e, 6f, which represent a set of indexes, are index display images. On the other hand, the capsule images 7a and 7b, which represent arithmetic operation information, are arithmetic operation capsules.

The retrieval indexes represent indexes for use in collating and retrieving information from the database 101. Generally, the retrieval indexes are referred to as keywords, key items, and so forth. The retrieval indexes are constructed of attributes retrieved from information stored in the database 101. Thus, in the database retrieval, by collating the retrieval indexes with the information indexes, a set of required information can be extracted. At that point, by linking a plurality of retrieval indexes by using logical operations, more accurate information can be obtained. Thus, proper retrieval indexes should be readily selected. In addition, logical operations should be performed without restrictions. To satisfy these conditions, the information retrieval apparatus according to the present invention performs this retrieval operations by using the above mentioned capsule images.

With reference to FIG. 2, the selection operation of retrieval indexes by using the capsule images 3, 4, 5, 6, ..., and so forth will now be described.

In FIG. 2, reference numeral 8R is the right hand of the virtual arms. As shown in FIG. 1, the virtual arm 8R is a virtual image which can perform the same motion patterns as the real hand of the user such as moving in a three-dimensional image space, opening and closing the hand by input information. FIG. 2 shows the situation where the thumb and the index finger of the right hand 8R of the virtual arms 8 hold the capsule image 4g. By a motion pattern against the capsule image 4g, a retrieval index for a set logical operation shown by the capsule image 4g in accordance with a motion pattern thereof is selected.

In this embodiment, a holding motion was exemplified. However, as input motions, a capsule image can be held by the entire right hand 8R of the virtual arms or lightly touched by any finger of the right hand 8R.

In addition, according to this embodiment, when the user holds the capsule image 4g with the right hand 8R, he can recognize the status of the information being selected with a changed color of the capsule image 4g, a selection acceptance sound, or a flashing light. Thus, the user 90 can readily sort retrieval indexes and have a caution and a warning to an incorrect operation with a sound and a light.

Figure 19:
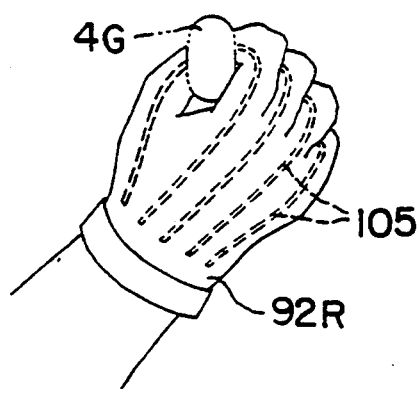
FIG. 19 is a schematic diagram showing a pressure stimulating mechanism build in a data glove.

Moreover, when the user 90 holds the capsule image 4g with the virtual right hand 8R, he can have a pressure on his real right hand. In other words, as shown in FIG. 19, the data glove 92R is provided with a pressure exerting mechanism 105. The pressure exerting mechanism 105 is activated in accordance with information being input from the real right hand of the user 90 to the data glove 92R.

For example, when the arithmetic operation unit 94 receives input information from the data glove 92R and determines that the virtual right hand 8R holds the capsule image 4g, the pressure exerting mechanism 105 of the data glove 92R is activated and an actual pressure is transferred to the real right hand of the user 90. Thus, the user 90 can positively have a "holding" sense.

As a practical example of the pressure exerting mechanism 105, a method where a force applied to each finger is detected by a respective distortion gauge and converted into an air pressure applied to a respective inner balloon can be used.

Moreover, in this embodiment, when the size of any capsule is changed depending on the amount of information of a relevant retrieval index, the user 90 can instantly and visually determine the size of the information.

On the other hand, the left hand 8L of the virtual arms shown in FIG. 1 represents the state wherein the index finger attempts to flip the capsule image 4c. With this motion, the user 90 can delete the capsule image 4c out of the screen. In this example, a practical flipping motion was shown. However, when the user 90 attempts to delete any capsule image, he can use the back of any finger to flip any capsule image or hold the capsule image and throw it out of the frame 2.

Further, like keywords, the contents of the above mentioned retrieval indexes can be displayed on capsule images. The information displayed with keywords can be retrieved. In this case, for example, by holding two capsule images representing keywords with the fingers one after the other, information relevant to the two keywords can be immediately displayed. This information retrieval method is particularly effective in the event that the user 90 attempts to retrieve complicated information relevant to a plurality of keywords.

With reference to FIGS. 3 to 7, an example of motion patterns of the hands recognized by the data glove 92 will now be described.

Generally, the hands of the human beings can perform several motions such as holding, picking, flipping, selecting, and moving objects. By using capsule images as objects, set logical operations for retrieval indexes displayed with capsule images can be performed in accordance with a variety of motion patterns, and arithmetic operation commands for the retrieval indexes can be input to the arithmetic operation unit.

Next, definitions of motion patterns of the hands will be exemplified.

Figure 3:
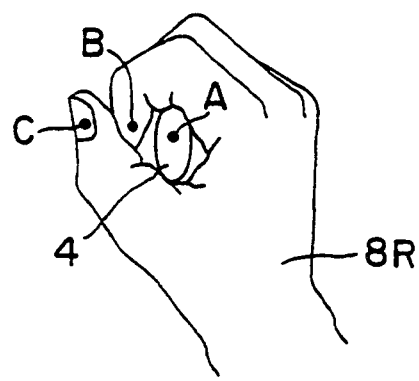
FIG. 3 is a schematic diagram showing an example of a motion pattern of the user's hand.

FIG. 3 is a schematic diagram showing a "gripping" motion for gripping the capsule image 4 with the palm of the virtual arm 8R. At that point, the coordinates of the position of the capsule image 4 are tracked by the computer. The state where the virtual arm 8R grips the capsule image 4 is recognized when the coordinates of capsule image 4 (A), the coordinates of sensor (B) disposed at the end of the index finger, and the coordinates of sensor (C) disposed at the end of the thumb are aligned in the sequence of (A)-(B)-(C). At this point, in the embodiment, the retrieval index of the capsule image 4 gripped within the palm is extracted for collating and retrieving information.

Figure 4:
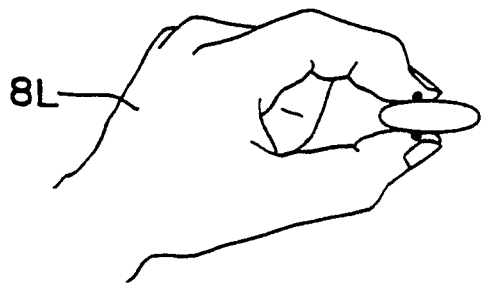
FIG. 4 is a schematic diagram showing an example of a motion pattern of the user's hand.

FIG. 4 is a schematic diagram showing a "holding" motion. When the distance between the sensor disposed at the end of the index finger and that of the thumb is less than a predetermined value and a capsule image of a keyword is present between these sensors, the state for holding the capsule image is recognized. Alternatively, by processing a three-dimensional image, it can be recognized.

Figure 5:
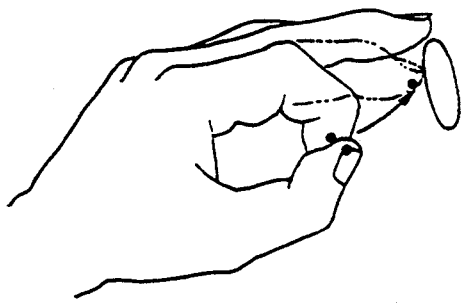
FIG. 5 is a schematic diagram showing an example of a motion pattern of the user's hand.

FIG. 5 is a schematic diagram showing a "flipping" motion. When the motion speed or the velocity of the finger tip detected by the relevant sensor disposed at the end of the index finger exceeds a predetermined value and the index finger interferes with any capsule image, the state wherein the retrieval index of the capsule image is deleted is recognized.

Figure 6A:
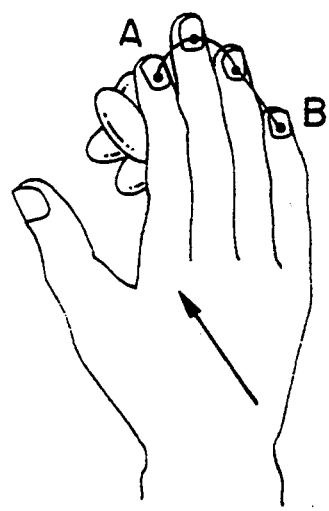
FIGS. 6(a) and 6(b) are schematic diagrams showing examples of lotion patterns of the user's hand.
Figure 6B:
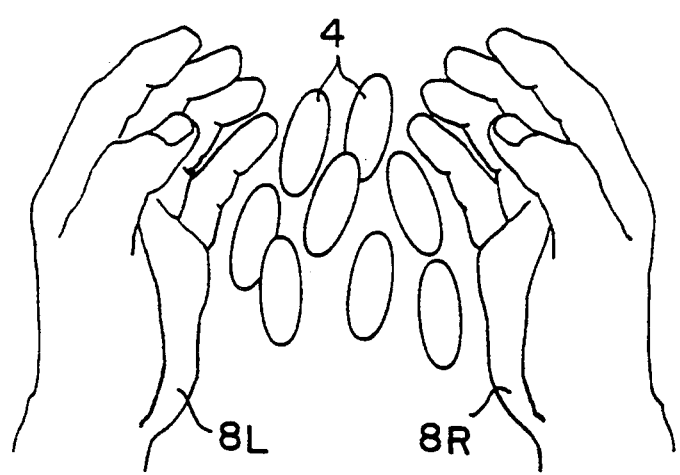

FIGS. 6 (a) and 6 (b) are schematic diagrams showing a "selecting" motion. In FIG. 6 (a), when the sensors disposed at the finger tips of the four fingers approach each other and a virtual line (A)-(B) interferes with any capsule image, the state wherein the retrieval index of the capsule image is moved is recognized. In addition, as shown in FIG. 6 (b), any capsule images can be selected from those surrounded by both hands.

Figure 7:
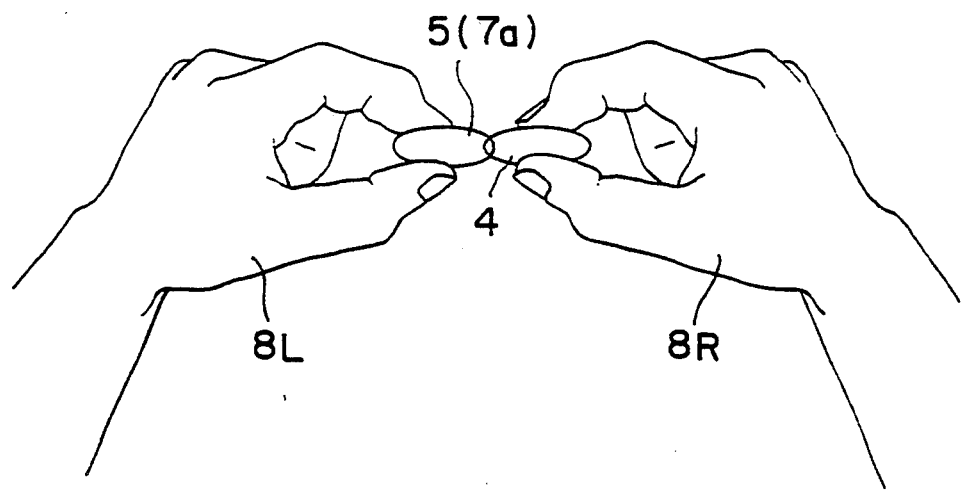
FIG. 7 is a schematic diagram showing an example of a motion pattern of the user's hand.

FIG. 7 shows an example of a set logical operation. In the figure, when the right hand 8R holds the capsule image 4 and the left hand 8L holds the capsule image 5, the state wherein the AND operation of both retrieval indexes is performed is recognized. At this point, when the right hand 8R picks (holds) the capsule image 4 which is a set of retrieval indexes to be retrieved (or a plurality of capsule images), a predetermined logical operation for the retrieval index of the right hand 8R can be executed.

For example, when the right hand 8R holds the capsule image 4 and the left hand 8L holds the capsule image 5, the "OR" operation of the index of the capsule image 4 and the index of the capsule image 5 can be performed. Alternatively, under the assumption that the operation capsule image 7a represents an "AND" logical operation means, when the user 90 contacts or overlaps the capsule images 4 and 5 held by the right hand 8R with the operation capsule image 7a held by the left hand 8L one after the other, the "AND" operation of the indexes of the image capsules 4 and 5 can be "performed".

In addition, particular hand motion patterns such as for stopping a process during retrieval execution can be defined. In this case, by designating unusual hand motions, incorrect motions can be prevented.

In the above mentioned motion patterns, the use of the data gloves was exemplified. However, it should be appreciated that any input unit which can keep track of hand motion patterns can be used regardless of what construction the input unit has. Moreover, it should be understandable that besides the eyephone, any three-dimensional display unit can be used.

Next, an effective retrieval method in the case where retrieval indexes of capsule images contain time factors will be described.

Figure 8:
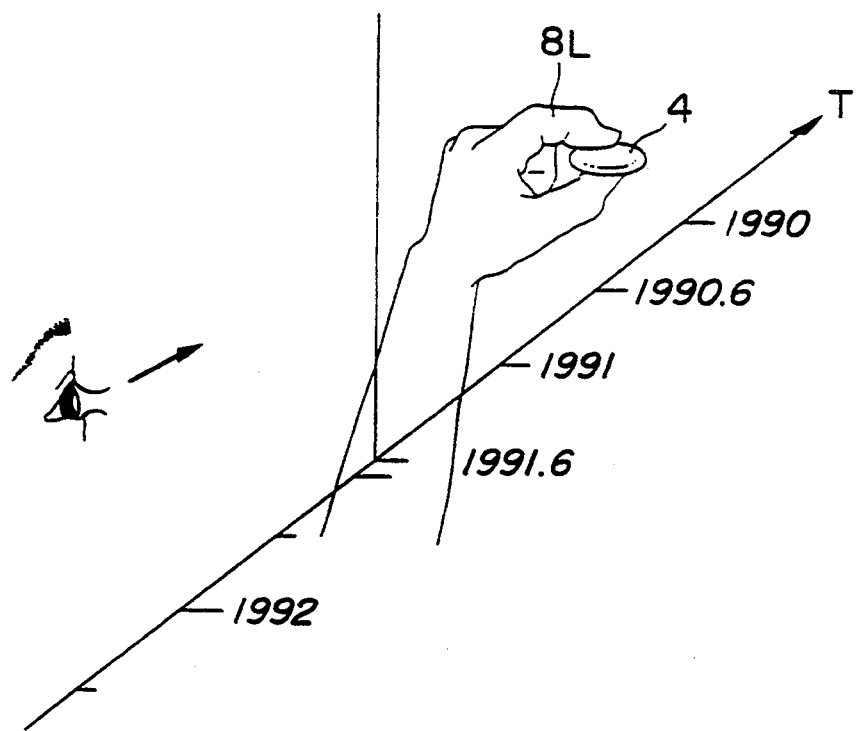
FIG. 8 is a schematic diagram conceptually showing time coordinate axis T in a three-dimensional image space.
Figure 9:
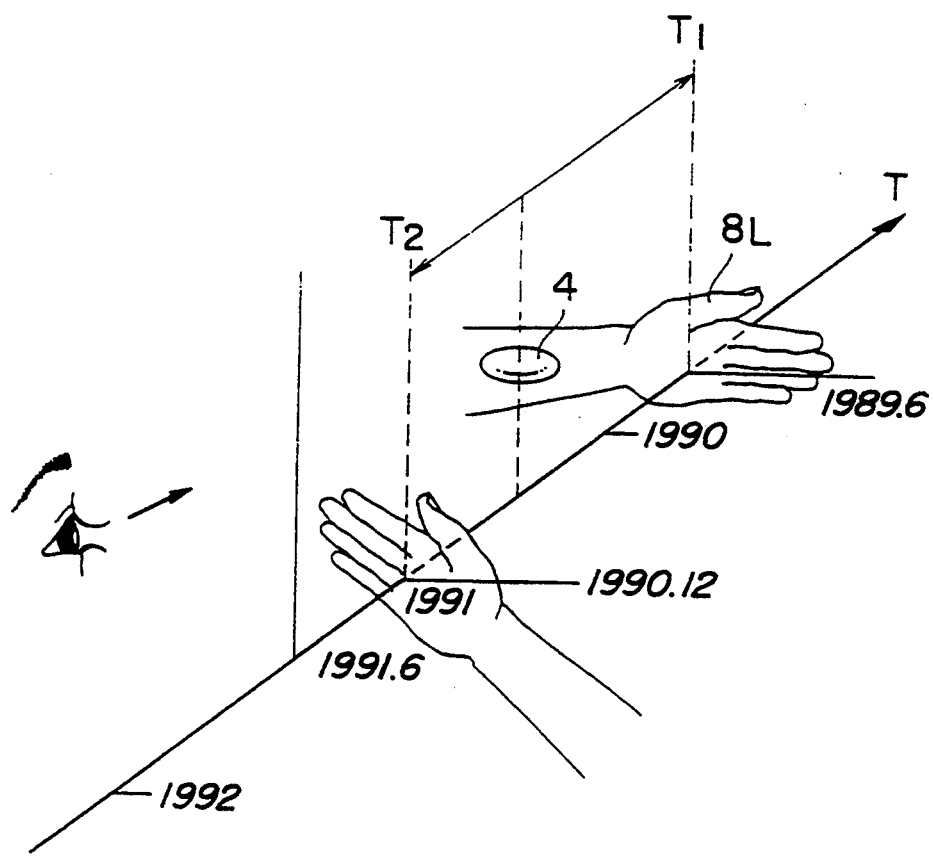
FIG. 9 is a schematic diagram conceptually showing time coordinate axis T in a three-dimensional image space.

FIG. 8 shows a linear time coordinate axis T displayed in a three-dimensional image space. In the figure, the capsule image 4 is displayed in such a way that it floats along the time coordinate axis T. Since the capsule image 4 contains a time factor as a retrieval index, data corresponding to the time coordinate axis T at which the capsule image 4 is present can be retrieved from the relevant database. For example, when the capsule image 4 is present at a position of June, 1990 on the time coordinate axis T, only data with respect to June, 1990 is extracted from data which is hit with the retrieval index of the capsule image 4. In the case where the user 90 wants to obtain data with a particular range of the time factor of this capsule image, when he intercepts the time coordinate axis T with both the hands 8R and 8L of the virtual arms as shown in FIG. 9, the range (from T1 to T2) can be designated. Thus, for example, data in the range from June, 1989 to December, 1990 can be extracted as the time factor of the relevant capsule image from the database.

However, on this linear time coordinate axis T, the depth of the axis is linearly proportional to the elapse of years. Thus, when the user 90 retrieves data which relates to old years of the time coordinate axis T, he would have difficulty in moving his hands.

Figure 10A:
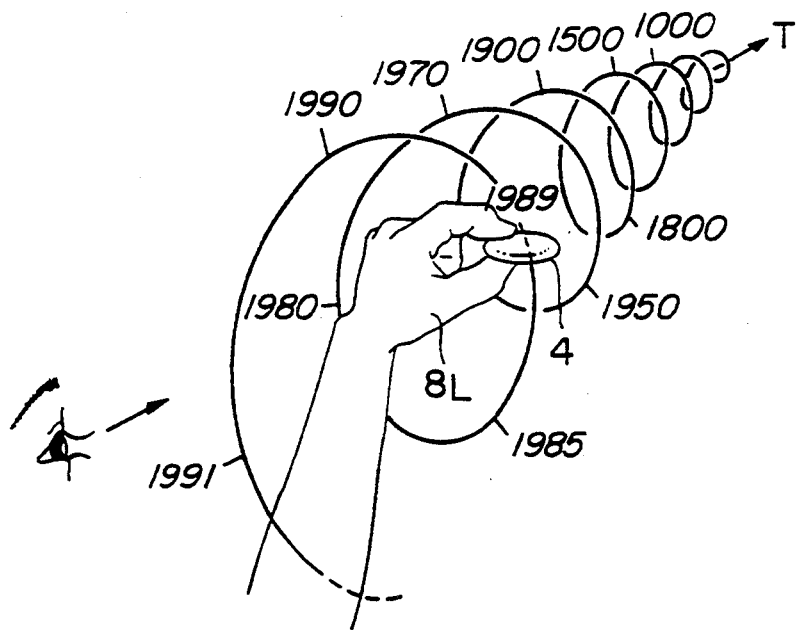
FIGS. 10 (a), 10 (b), and 10 (c) are schematic diagrams conceptually showing time coordinate axis T in a three-dimensional image space.
Figures 10B, 10C:
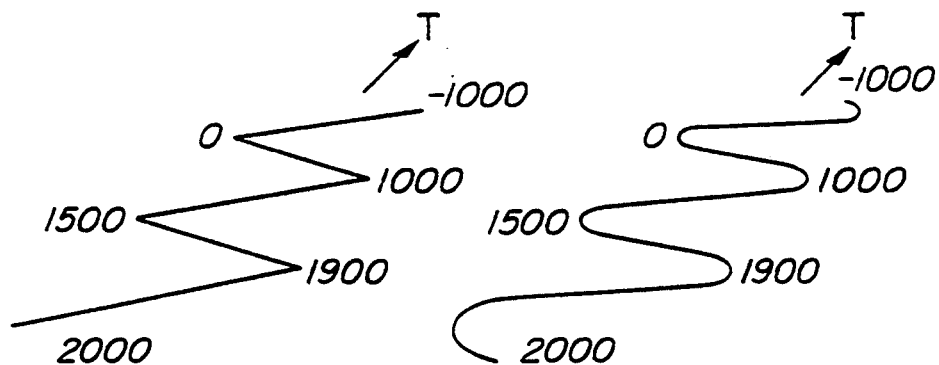

To overcome this drawback, as shown in FIG. 10 (a), by arranging the time coordinate axis T in a spiral shape, the direction of depth of the image space can be effectively used. In this case, the time steps of the time coordinate axis T can be varied in such a way that the old years are coarsely allocated. Thus, years can be effectively allocated on the time coordinate axis T. In FIG. 10 (a), when the user 90 holds the capsule image 4 with his left hand 8L, he can move the capsule image 4 along the time coordinate axis T. In addition, for example, by drawing a circle several times with the left hand 8L, the user 90 can move the capsule image 4 along the time coordinate axis T. Further, as shown in FIG. 10 (b), the time coordinate axis T can be formed in a zigzag shape. Furthermore, as shown in FIG. 10 (c), the time coordinate axis T can be formed in a snaky shape.

As described above, according to the present invention, since the user 90 can straightforwardly select desired information from a plurality of capsule images displayed in a three-dimensional image space with his hands, the present invention can be applied to a variety of information retrieval systems which are currently available such as encyclopedia information retrieval systems, newspaper information retrieval systems, baseball information retrieval systems, patent information retrieval systems, historical information retrieval systems, map information retrieval systems, medical information retrieval systems, telephone directories, company organization information retrieval system, and personal information retrieval systems.

Next, with reference to FIG. 11, a practical information retrieval method of an encyclopedia information retrieval system will be described.

Figure 11:
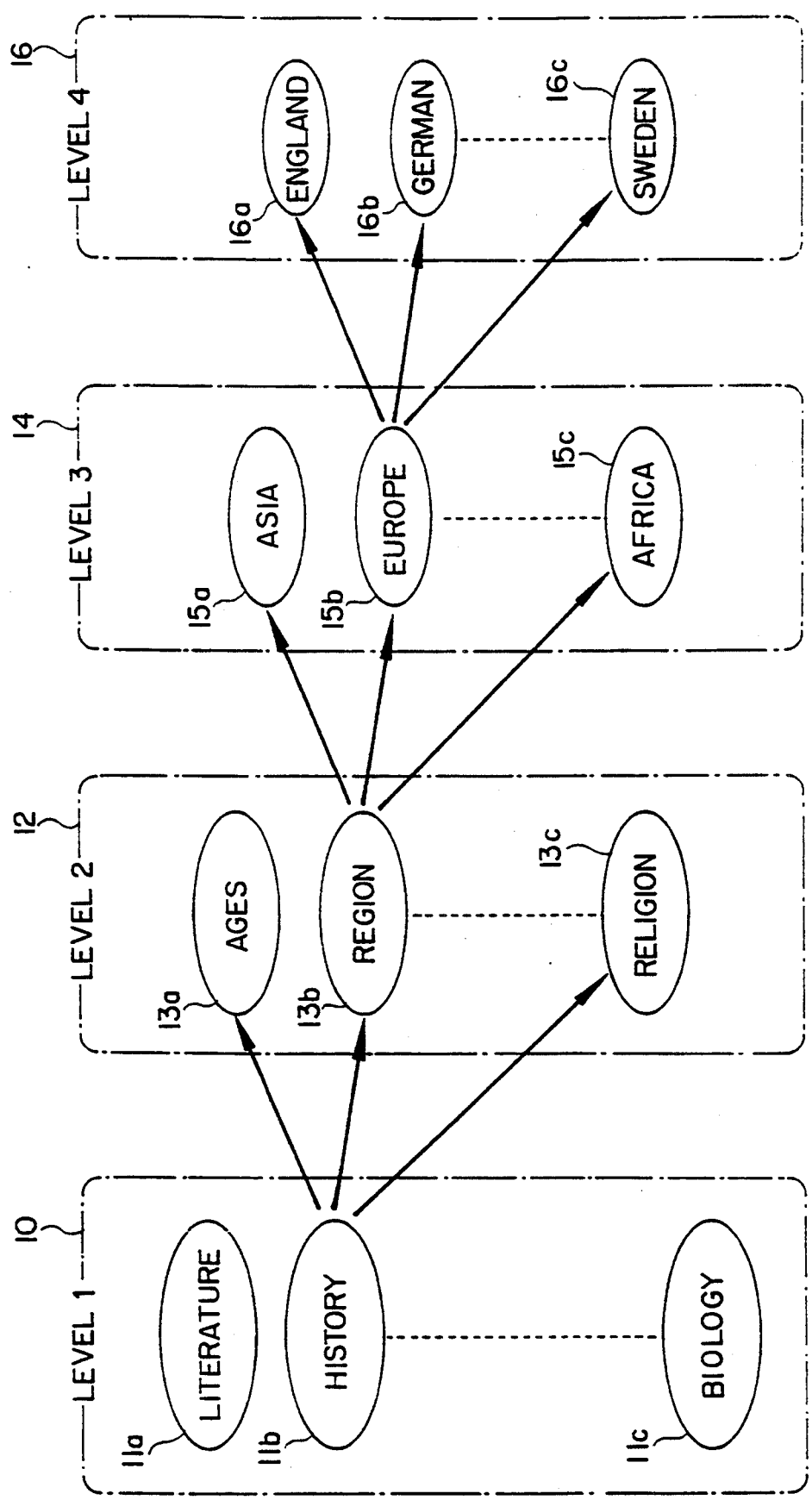
FIG. 11 is a schematic diagram hierarchically showing an example of the conception of an encyclopedia retrieval system of an embodiment of the present invention.

FIG. 11 is a schematic diagram conceptually showing a retrieval method in which the user hierarchically selects a desired conception from a large category to a small category.

First, capsule images 11a, 11b, and 11c which are in level 1 as large category information are displayed in the above mentioned three-dimensional image space. At this point, the user 90 will directly hold the capsule image 11b representing "history" which is the desired information from the capsule images 11a, 11b, and 11c in the above mentioned manner. Then, the present screen will be changed and capsule images 13a, 13b, and 13c which are in level 2 will be displayed. At this point, the user 90 will select the capsule image 13b representing "region" which is the desired information in the same manner as at the level 1 from the capsule images 13a, 13b, and 13c. Then, the present screen will be changed as in the level transition from the level 1 to the level 2. Then, capsule images 15a, 15b, and 15c which are in level 3 will be displayed. At this point, the user 90 will select the capsule image 15b representing "Europe" from the capsule images 15a, 15b, and 15c. Likewise, the present screen will be changed. Then, capsule images 16a, 16b, and 16c in level 4 will be displayed. At this point, when the user 90 selects the capsule image 16b representing "Germany" which is the desired information, the present screen will be changed and a capsule image representing for example "medieval ages" as a selection item of Germany historical information will be displayed. Thus, by selecting these capsule images one after the other, the user 90 can obtain the desired information. This operation for selecting retrieval indexes can be executed in a very short period of time.

In the above described retrieval method, the screen of each level was changed one after the other. However, it should be understandable that capsule images can be selected in other ways. Although the level 1, which is the largest category, should be selected first because it is the base position of the information retrieval operation, the display sequence of capsule images of the level 2 or lower levels is not limited. For example, in any of the following three manners, the user 90 can reach the desired conception.

Sequence 1: History →region →Europe →German →ages →medieval ages →religion

Sequence 2: History →ages →medieval ages →region →Europe →German →religion

Sequence 3: History →religion →region →Europe →ages →medieval ages

Thus, capsule images in a plurality of levels (for example level 2 or lower levels) can be displayed at a time as shown in FIG. 11. Alternatively, by grouping capsule images through a plurality of selection screens, those in the level 1 only or those in the level 2 only can be displayed.

Next, with reference to FIGS. 12 and 13, an operation method that the user 90 can use will be described in detail.

In these figures, the retrieval is sequence represented with STEP 1 to STEP 6. In accordance with these steps, the operation method will be described. STEP 1:

The user 90 will select a capsule image representing the desired conception from capsule images in the level 1, which is the largest category. These capsule images are displayed in such a way that they are floating in the three-dimensional image space. Then, the user 90 will select and hold a desired capsule image representing the conception to be retrieved with, for example, the left hand 8L. Thereafter, the user 90 will move the capsule image held with the left hand 8L to a storage area 7 disposed on the right of the three-dimensional image space (see FIG. 12 (a)).

STEP 2:

The user 90 will select and hold a capsule image representing the desired conception from capsule images in the level 2 with his left hand 8L. Thereafter, the user 90 will move the capsule image held by the left hand 8L to the storage area 7 (see FIG. 12 (b)).

STEP 3:

The user 90 will select and hold a capsule image representing the desired conception from capsule images in the level 3 with his left hand 8L. Thereafter, the user 90 will move the capsule image held with the left hand 8L to the storage area 7 (see FIG. 12 (c)).

STEP 4:

The user 90 will select and hold a capsule image representing the desired conception from capsule images in the level 4 with his left hand 8L. Thereafter, the user 90 will move the capsule image held with the left hand 8L to the storage area 7 (see FIG. 13 (a)).

STEP 5:

The user 90 will select and hold a capsule image representing the desired conception from capsule images in the level 5 with his left hand 8L. Thereafter, the user 90 will move the capsule image held with the left hand 8L to the storage area 7 (see FIG. 13 (b)).

Figure 13B:
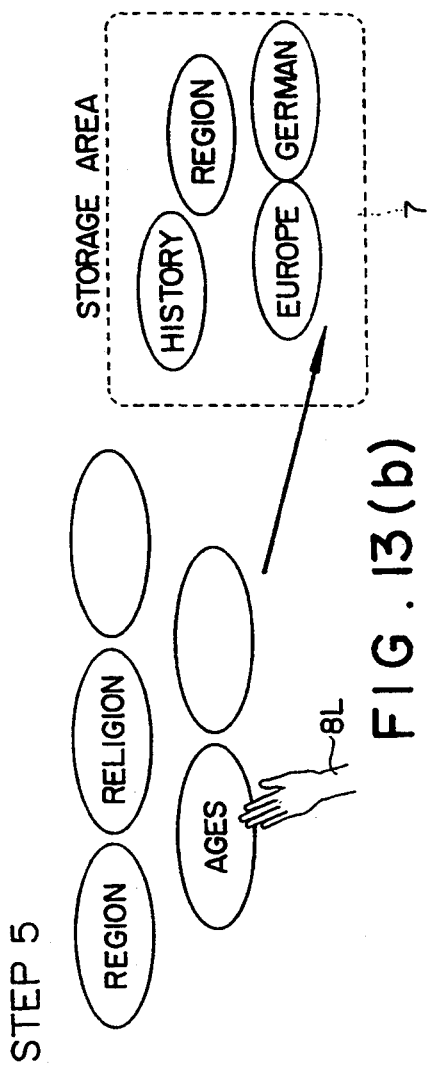
FIGS. 13 (a), 13 (b) and 13 (c) are schematic diagrams showing the information retrieval sequences of the encyclopedia retrieval system of FIG. 11.
Figure 13C:
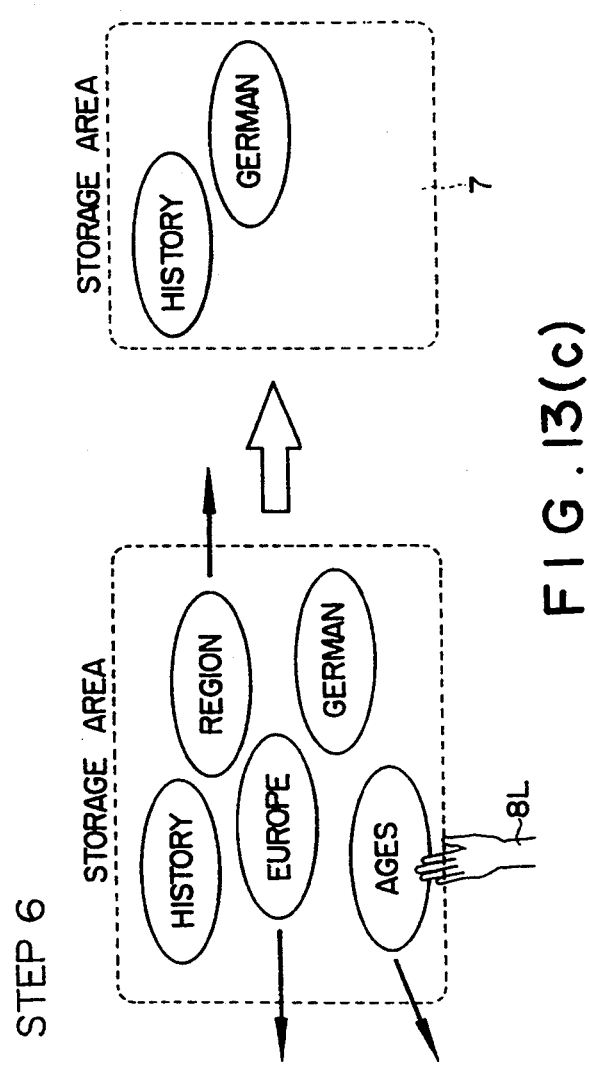

STEP 6:

Next, the user 90 will flip unnecessary capsule images out of the storage area 7 with the left hand 8L (see FIG. 13 (c)). Thereafter, the user 90 will move the remaining capsule image from the storage area 7 to a desired year (age) position on the time coordinate axis T newly displayed (see FIG. 14 (a)). In FIG. 13 (c), the reason why the user 90 flips the unnecessary capsule images out of the storage area 7 is to clearly and readily perform the subsequent retrieval operations.

Figure 14A:
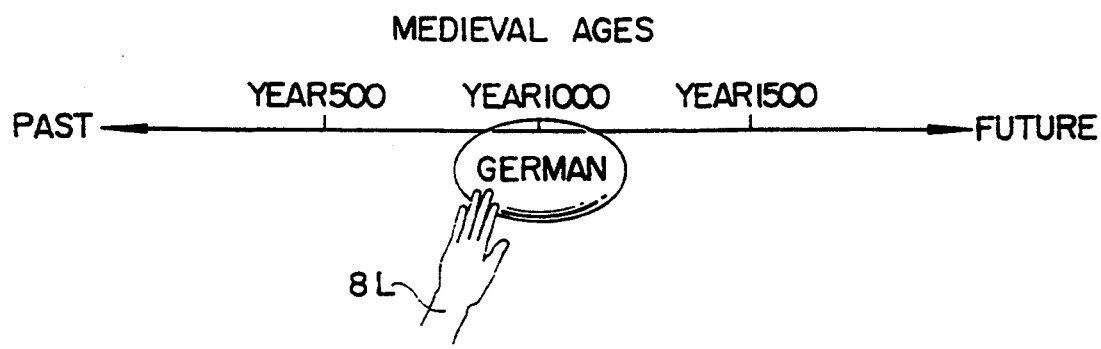
FIGS. 14 (a) and 14 (b) are schematic diagrams showing information retrieval sequences for the content of the retrieval result of FIG. 13 (c) by using the time coordinate axis T.
Figure 14B:
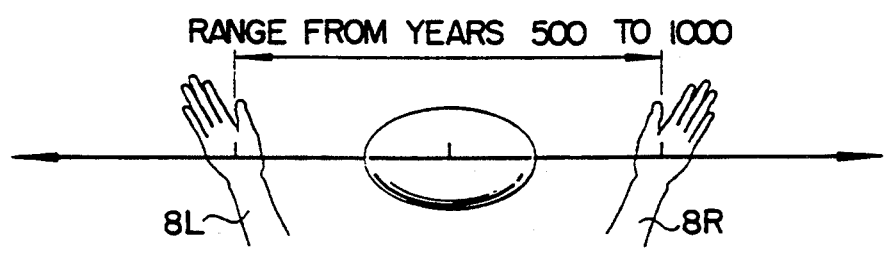

When the user needs the information with respect to the medieval ages, he will place the selected capsule image in the position of year 1000 (see FIG. 14 (a)). When the user 90 needs the information in the range from years 500 to 1500, he will place the left hand 8L at the position of year 500 and the right hand 8R at the position of year 1500 to designate the range of years (see FIG. 14 (b)). When years on the time coordinate axis T are designated, the relevant historical events can be displayed in predetermined output formats. Thus, the sequence of retrieval operation is completed.

When the user 90 needs to designate a range of years on the time coordinate axis T, he will retrieve information through three-dimensional image spaces being changed one after the other. To complete the retrieval operation, the user 90 can perform predetermined operations as the sign, such as turning the hand(s), pushing a particular capsule image, or holding a capsule image representing "END."

The above description focused on the retrieval operation of historical events. Further, for example, in the case for retrieving the evolutionary process of creatures, if the time coordinate axis T is present from the right to the left in the display space, when the user 90 extends the left hand to the left and the right hand to the right, he can retrieve information in the past and in the future (predictable information). Moreover, in the case where the time coordinate axis T is set in the direction of depth of the display space, when the operator 60 performs hand motions such as moving the hand(s) inwardly or outwardly, he can straightforwardly and readily retrieve information with respect to time factors along the time coordinate axis T.

In the case where information to be retrieved does not contain time factors, a "coefficient of importance" can be applied to the time coordinate axis T so as to display weighted information in accordance with the positions along the time coordinate axis T. In the case where there are several sets of relevant information, when the user 90 holds particular information, the relevant information can be redisplayed. Thus, even if a great amount of information is handled, the user 90 can straightforwardly handle it without confusion.

Next, with reference to FIGS. 15 and 16, a retrieval method for selecting information with set logical operations by using capsule images in the same level will be described.

Figure 15A:
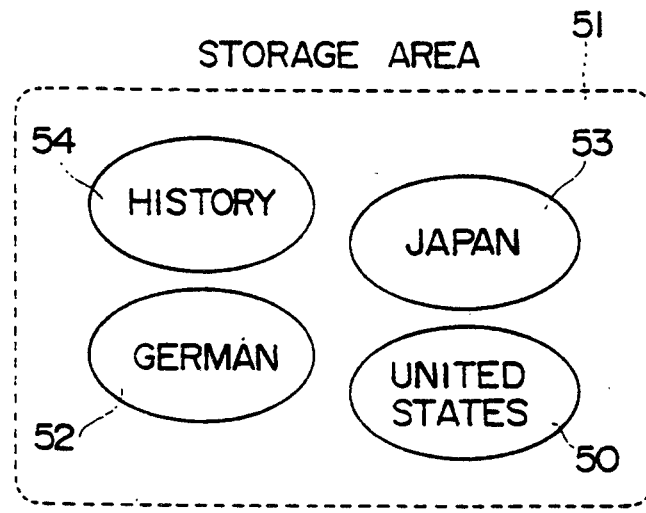
FIGS. 15 (a) and 15 (b) are schematic diagrams showing an example of a set logical operation.
Figure 15B:
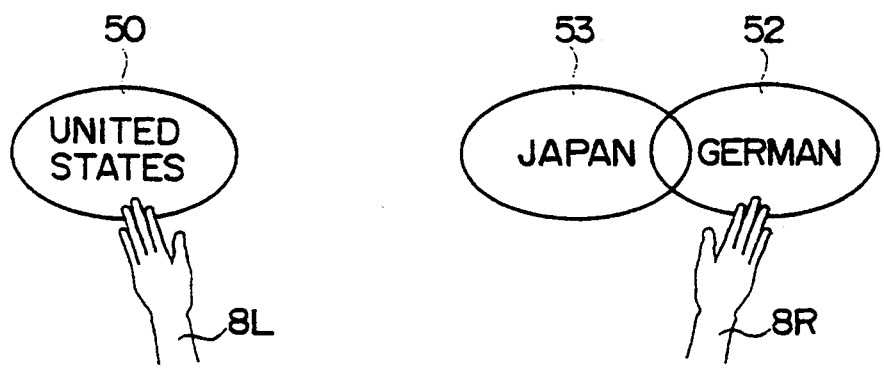
Figure 16:
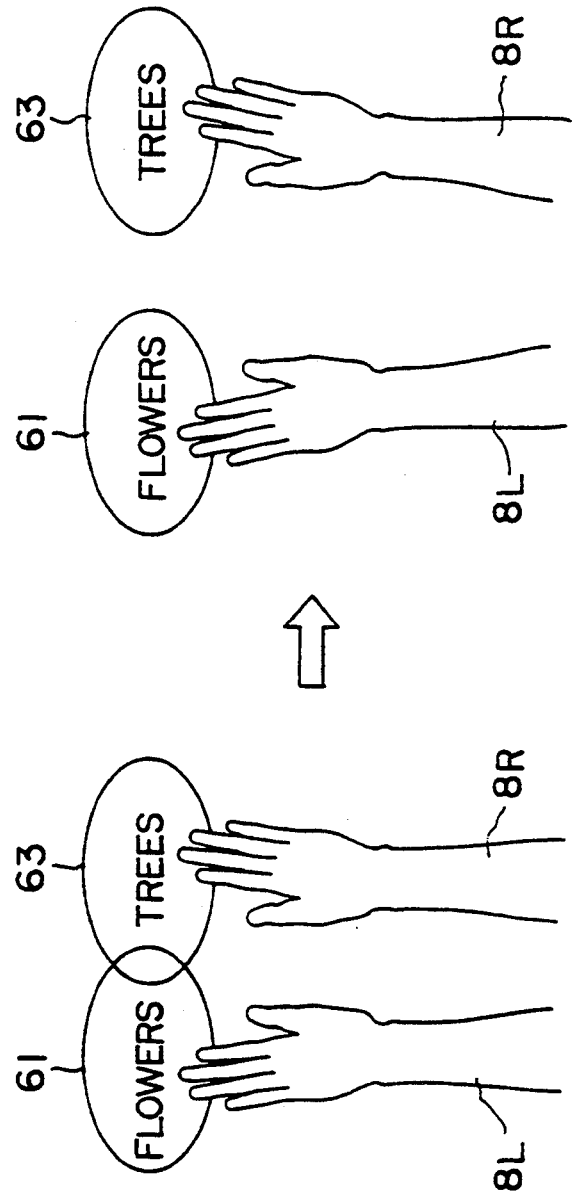
FIG. 16 is a schematic diagram showing an example of a set logical operation.

FIG. 15 (a) shows the case where the user 90 will select a capsule image 50 representing for example "United States" in the same situation of the STEP 4, move the capsule image 50 to a storage area 51, and select and move a capsule image 53 representing "Japan" and a capsule image 52 representing "Germany" to the storage area 51. Thereafter, as in the STEP 6 in FIG. 13 (c), the user 90 will flip unnecessary images out of the storage area 51 in the same manner as in the STEP 6 shown in FIG. 13 (c) so as to display the three capsule images which are the capsule image 50 representing "United States", the capsule image 53 representing "Japan", and the capsule image 52 representing "Germany."

Thereafter, as shown in FIG. 15 (b), the user 90 will hold the capsule image 53 representing "Japan" and the capsule image 52 representing "Germany" with the right hand 8R and then contact the two capsule images 52 and 53 against each other. This motion represents an AND operation of the two capsule images 52 and 53. Thus, information in common with the two capsule images 52 and 53 can be retrieved in the subsequent step. In addition, when the user 90 holds the two capsule images 52 and 53 in contact with each other with the right hand 8R and the capsule image 50 representing "United States" with the left hand 8L, the OR operation of the capsule images held with the left and right hands 8L and 8R can be represented. In other words the situation shown in FIG. 15 (b) represents a motion for retrieving a set of information in common with the capsule image 53 representing "Japan" and the capsule image 52 representing "Germany" and information of the capsule image 50 representing "United States".

Of course, it is possible to define the motion for contacting the capsule images 52 and 53 against each other as an OR operation and the motion for holding the capsule image 50 as an AND operation.

Thus, by two types of motions for holding a plurality of capsule images at a time, an AND operation and an OR operation can be simply represented and a set of information to be retrieved can be readily designated and changed.

Next, with reference to FIG. 16, a retrieval motion of an exclusive OR operation will be described.

In the case where the user 90 will select capsule images representing "creatures", "plants", and "flowers" in this sequence and place them in a storage area, he will select a capsule image representing "trees" from "plants" and place the selected capsule image in the storage area. Thereafter, the user 90 will pick a capsule image 61 representing "flowers" from the storage area with the left hand 8L and pick a capsule image 63 representing "trees" with the right hand 8R. Thereafter, the user 90 will contact the capsule image 63 representing "trees" against the capsule image 61 representing "flowers" and then separate them. This motion represents an exclusive OR operation. In other words, this motion represents "flowers" which do not blossom on "trees" or "trees" which do not flower. In addition, a negation can be represented by a motion for holding a capsule image and then turning it. Thus, according to this embodiment, by natural motions of human beings such as contacting capsule images against each other, separating them, and turning them, the user 90 can retrieve information.

Figure 17:
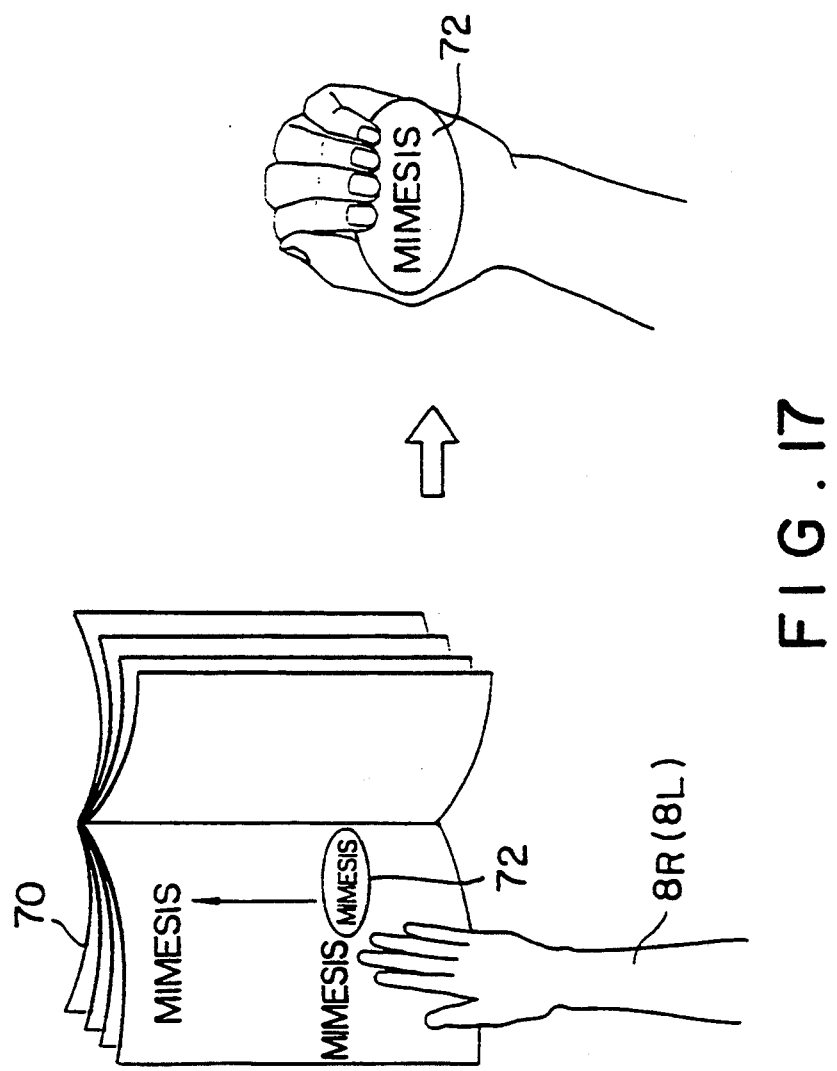
FIG. 17 is a schematic diagram showing an example of a word and phrase search operation in accordance with another embodiment of the present invention.

FIG. 17 is a schematic diagram showing a retrieval method in accordance with another embodiment of the present invention.

In the figure, a dictionary 70 with words alphabetically arranged is displayed in a three-dimensional image space. When the user 90 consults the dictionary 70, he can scroll screens by touching the surface of the dictionary 70, which is an image, with the hand 8R or 8L and leaf through the pages thereof. In this case, the user can scroll the screens by knocking the left hand 8L and the right hand 8R. When there is a hit of word, phrase or topic, the user 90 can pick up an icon representing the word, phrase, or topic from the dictionary 70 so as to directly retrieve the object.

Since every word and every phrase of each page of the dictionary 70 has an embedded icon 72, the icon 72 can function as an index of information like a capsule image. Thus, when dictionaries in a variety of categories are provided and information is retrieved in this way, since it is not necessary for the user 90 to carry heavy dictionaries, he will not be fatigued from the information retrieval operation.

Figure 18:
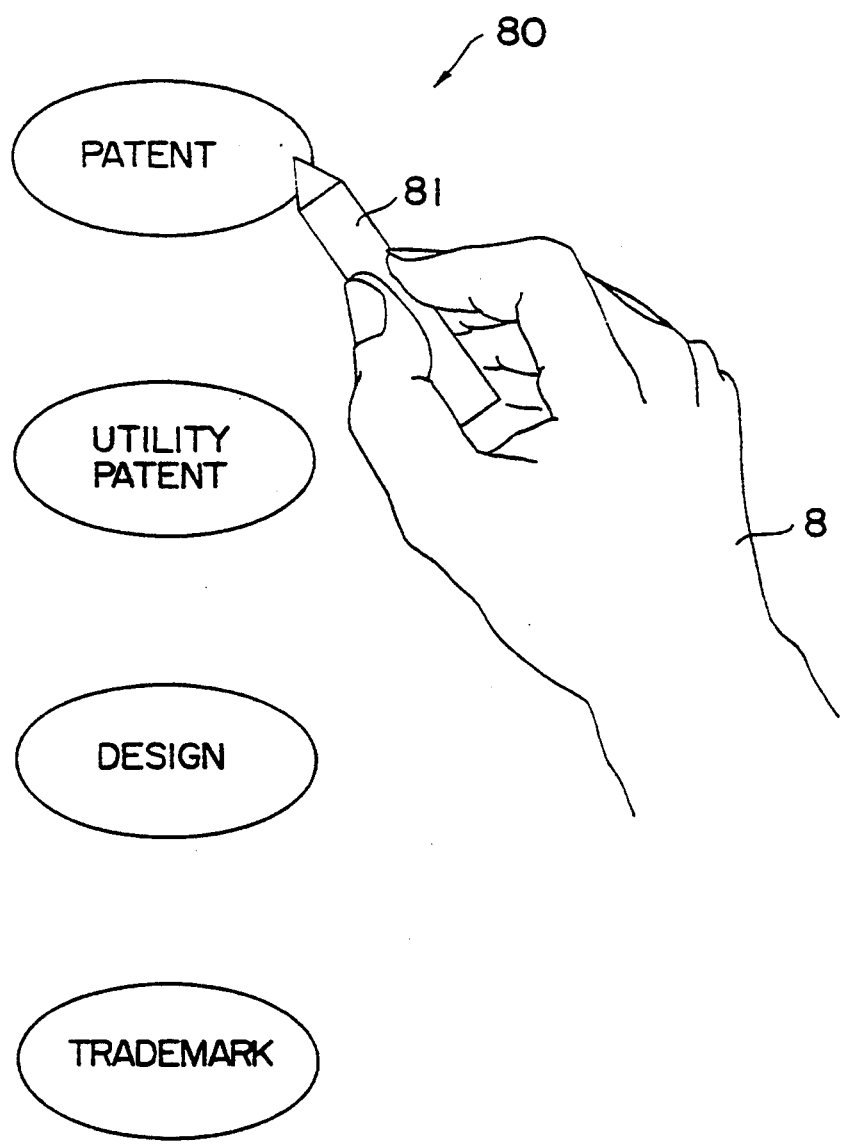
FIG. 18 is a schematic diagram showing a character describing operation in a three-dimensional image space in accordance with another embodiment of the present invention.

FIG. 18 shows a means for newly inputting a keyword which is not represented by a capsule image. An input means 80 has a shape of a pen 81 which is displayed in a space. The user 90 can hold the pen 81 with the virtual arm 8R or 8L. When the user 90 properly holds the pen 81, ink will discharge and thereby the user 90 can write characters in the space. When the user 90 attempts to create new keywords, relevant indexes for controlling attributes of the database should have been already provided.

As described above, by utilizing the feature whereby characters and/or geometrics images can be written and/or drawn in the space, the information retrieval apparatus of the present invention can be used as a teaching tool for children. In this case, the present invention can provide most people from children to aged people with interfaces to the computer graphics world.

In addition, when a keyboard that any user likes is displayed in the space and the user can input data from a unit which detects the above described hand (finger) motions, the user can select a favorite one from a variety of keyboards of different standards for use in inputting data. Thus, according to the present invention, the user can retrieve information by conventional keyboard operations that he is accustomed to.

In FIG. 1, an example wherein the motion patterns of the user's hands were detected by the data gloves 92R and 92L that he wears on his two hands and the motion patterns were used as input information was described. However, it should be understood that besides the motion patterns of the user's hands, the motion patterns of the user's head 110 can be detected by a head band 112 which supports the three-dimensional display unit 91.

Further, the motion patterns of the user's feet can be detected.

Furthermore, the motion patterns of the user's hands or the user's head can be detected by a TV camera 100 and the detected information can be sent to the arithmetic operation unit 94.

Figure 20:
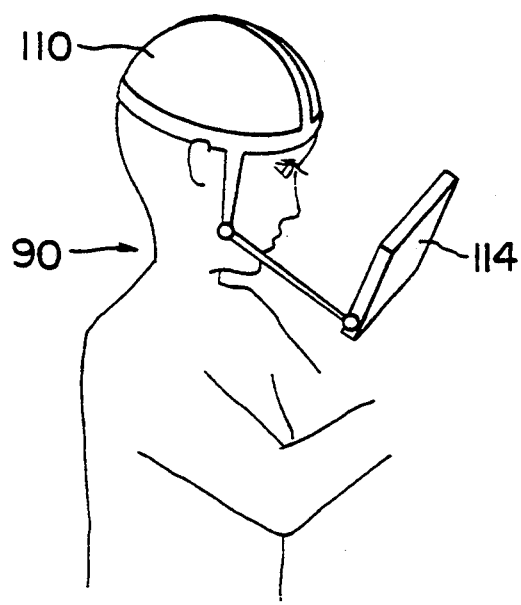
FIG. 20 is a schematic diagram showing a private eye that the user wears on his face.

In FIG. 1, an example wherein a three-dimensional image space is displayed before the eyes of the user 90 by the three-dimensional display unit 91 having ski goggle shape that the user 90 wears was described. However, as shown in FIG. 20, the user can wear a private-eye 114 at a position slightly away from the head 110 and see a three-dimensional image space displayed from the private-eye 114. When the private-eye 114 is used, the sense of oppression against the head 110 can be decreased. In addition, the shapes of capsule images displayed in the three-dimensional image spaces can be freely designated in accordance with their meaning and contents.

In FIGS. 1 and 2, an example where a three-dimensional image space was displayed by the three-dimensional display unit 91 that the user 90 wears was described. However, instead of the three-dimensional display unit 91, the user can wear a two-dimensional display unit 116 for displaying two-dimensional image spaces. When the user 90 wears the two-dimensional display unit 116, the virtual left hand 8L, the virtual right hand 8R, and the various capsule images 3, 4, 5, 6, and 7 are displayed in the two-dimensional image spaces.

Figure 21:
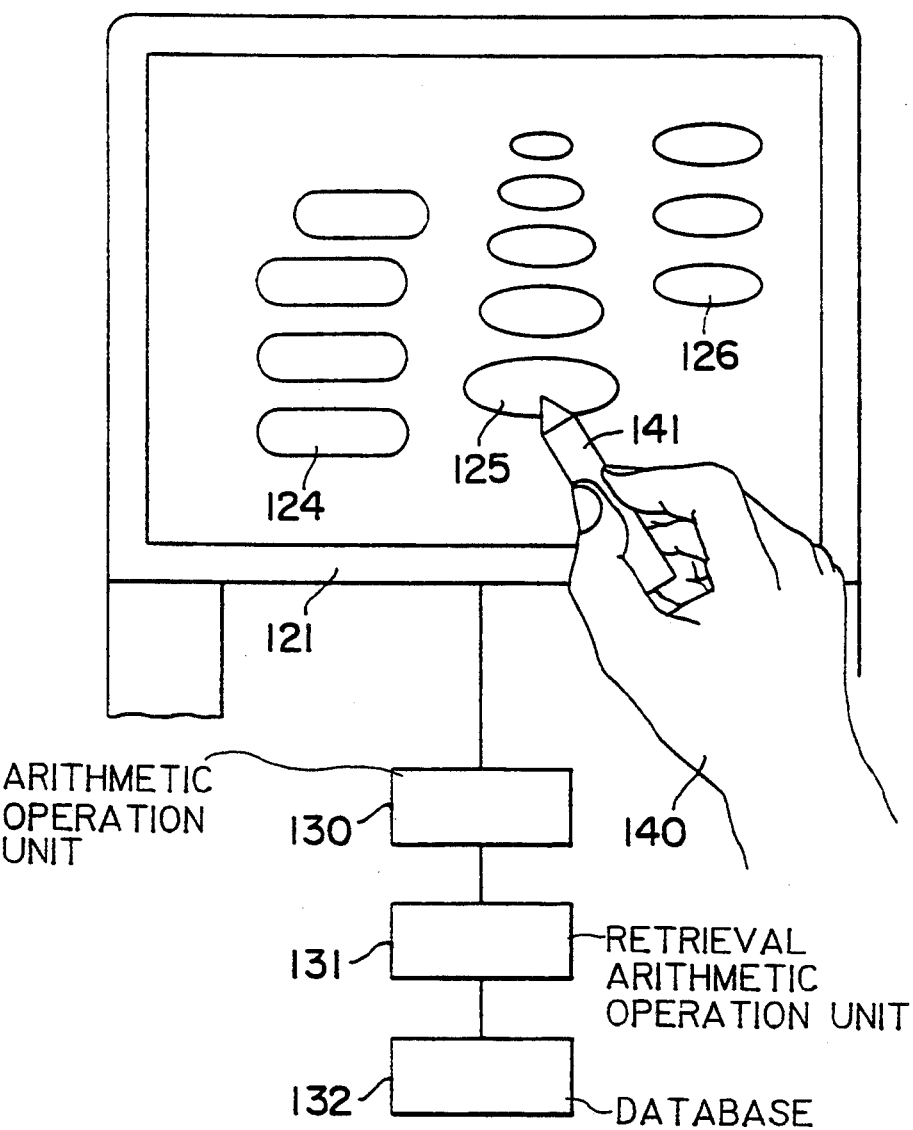
FIG. 21 is a schematic diagram showing a flat display screen which displays capsule images.

With reference to FIG. 21, another embodiment of the information retrieval apparatus in accordance with the present invention will be described. In the figure, capsule images (index display images) are displayed on a flat display screen (display unit) 121 such as a CRT display unit. These capsule images 124, 125, and 126 represent a set of indexes for controlling attributes of a database.

When the user contacts a touch pen 141 held in a real right hand 140 against the capsule images 124, 125, and 126 displayed on the screen 121, information for performing predetermined operation patterns can be input to the capsule images 124, 125, and 126. For example, when the user contacts the capsule image 125 with the touch pen 141 and moves the touch pen 141 to the position of the capsule image 124, the capsule images 125 and 124 can be superimposed.

In other words, the flat display screen 121 is connected to the arithmetic operation unit 130. The arithmetic operation unit 130 recognizes information which is input from the touch pen 141 and displays the motions of the capsule images on the screen 121. In addition, the arithmetic operation unit 130 performs set operations of indexes displayed with the capsule images 124, 125, and 126 in accordance with the information being input from the touch pen 141. The computed result of the arithmetic operation unit 130 is sent to the retrieval operation unit 131. The retrieval operation unit 131 inputs retrieval data into the database 132.

In FIG. 21, when the user moves the capsule image 125 to the position of the capsule image 124 and superimposes them together, an AND operation of the capsule images 124 and 125 Us represented. Thus, the arithmetic operation unit 130 can perform the AND operation of the capsule images 124 and 125. Thus, the user can retrieve information in common with each index displayed with the capsule images 124 and 125 from the database 132.

Next still another embodiment of the information retrieval apparatus in accordance with the present invention will be described with reference to FIG. 22.

Figure 22:
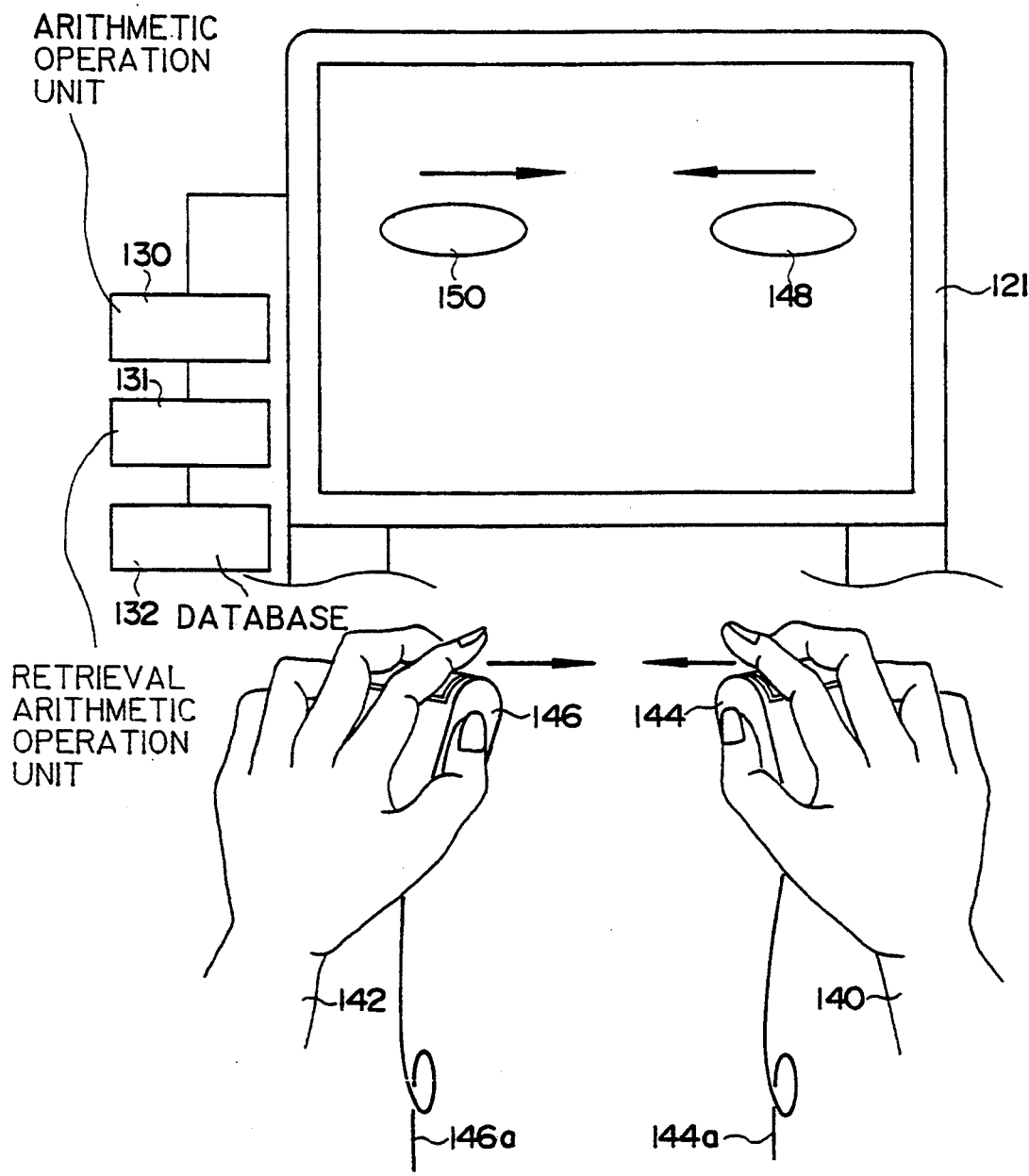
FIG. 22 is a schematic diagram showing another display screen which displays capsule images.

In FIG. 22, parts which correspond to parts shown in FIG. 21 are depicted by the same reference numerals, and detailed descriptions of them are omitted.

As shown in FIG. 22, a righthand mouse 144 having a cord 144a is held by the real right hand 140, and the righthand mouse 144 is slid on an operation plate (not shown) so that information for performing predetermined operation patterns can be input to a capsule image 148. A lefthanded mouse 146 having a cord 146a is held by a real left hand 142, and the lefthand mouse 146 is slid on the operation plate so that information for performing predetermined operation patterns can be input to a capsule image 150. In this way, for example, two capsule images 148 and 150 can be superimposed.

In this case, the cord 144a of the righthand mouse 144 and the cord 146a of the lefthand mouse 146 are connected to the arithmetic operation unit 130. The arithmetic operation unit 130 recognizes information which is input from the righthand mouse 144 and the lefthand mouse 146 and displays the motions of the capsule images 148 and 150 on the screen 121. In addition, the arithmetic operation unit 130 performs set operations of indexes displayed with the capsule images 148 and 150 in accordance with information input from the righthand mouse 144 and the lefthand mouse 146. The computed result of the arithmetic operation unit 130 is sent to the retrieval operation unit 131.

What is claimed is:

1. An information retrieval apparatus, comprising:
    a three-dimensional display unit for displaying a set of indexes controlling attributes of a database in a three-dimensional image space in the sight of a user with index display images so as to allow the user to visually recognize said set of indexes;
    an input unit for detecting a motion pattern of the user's body against said index display images as input information and for displaying the motion patterns in said three-dimensional image space; and
    an arithmetic operation unit for recognizing the input information of the motion patterns received through said input unit, for selecting indexes displayed with the corresponding index display images in accordance with the motion patterns and for performing set logical operations of the selected indexes in accordance with the motion patterns so as to collate and retrieve information from said database,
    wherein the index display images can be moved in the three-dimensional image space in accordance with the motion patterns of the user's body, and the index information of the indexes vary in accordance with the positions of the index display images in the three-dimensional image space.

2. The information retrieval apparatus as set forth in claim 1, wherein said input unit is arranged to detect motion patterns of the user's hands as input information and to display the motion patterns of the hands in a three-dimensional image space displayed by said three-dimensional display unit.

3. The information retrieval apparatus as set forth in claim 1, wherein said input unit is arranged to detect motion patterns of the user's head as input information and to display the motion patterns of the heads in a three-dimensional image display space displayed by said three-dimensional display unit.

4. The information retrieval apparatus as set forth in claim 1, wherein said three-dimensional display unit is arranged to display index display images on a time coordinate axis disposed in a three-dimensional image space, said arithmetic operation unit being arranged to perform set operations of indexes displayed with predetermined index display images in a time sequence.

5. The information retrieval apparatus as set forth in claim 1, wherein said input unit is a fitting member directly fitted on the user's body, said input unit being arranged to detect motion patterns of the body as input information.

6. The information retrieval apparatus as set forth in claim 5, wherein said fitting member is a pair of data gloves fitted on the user's hands.

7. The information retrieval apparatus as set forth in claim 6, wherein said data gloves have a pressure exerting mechanism for exerting a pressure to the user's hands in accordance with predetermined motion patterns thereof against index display images.

8. The information retrieval apparatus as set forth in claim 1, wherein said input unit is a TV camera for detecting motion patterns of the user's body.

9. A information retrieval apparatus, comprising:
    a three-dimensional display unit for displaying a set of indexes controlling attributes of a database in a three-dimensional image space in the sight of a user with index capsule images and a set of logical operation means with operation capsule images so as to allow the user to visually recognize said set of indexes and said set of logical operation means;
    an input unit for detecting motion patterns of the user's body against said index capsule images and said operation capsule images as input information and for displaying the motion patterns in said three-dimensional image space; and
    an arithmetic operation unit for recognizing the input information of the motion patterns received through said input unit, for selecting indexes displayed with the corresponding index capsule images and logical operation means displayed with the corresponding operation capsule images in accordance with the motion patterns and for performing set logical operations of the selected indexes by using the selected logical operation means so as to collate and retrieve information from said database,
    wherein the index capsule images can be moved in the three-dimensional image space in accordance with the motion patterns of the user's body, and the index information of the indexes vary in accordance with the positions of the index display images in the three-dimensional image space.

* * * * *